Feb. 15, 1938. H. E. THOMPSON 2,108,731
AUTOMATIC GRADING SCALE
Filed Feb. 24, 1937
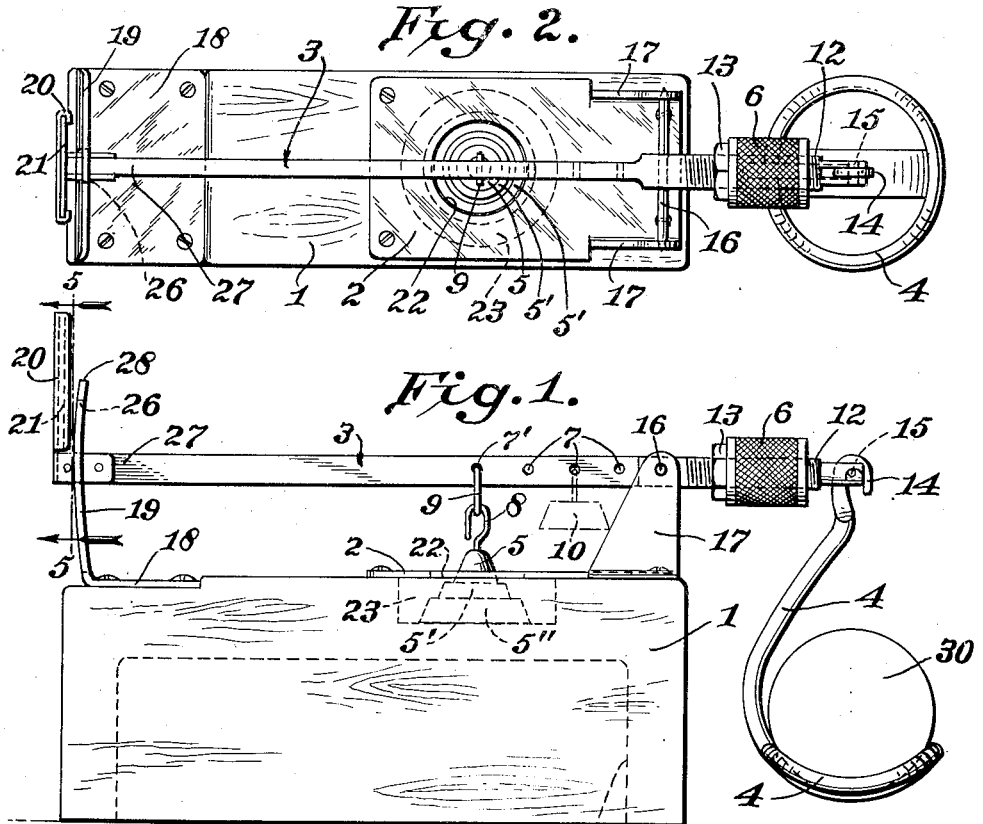
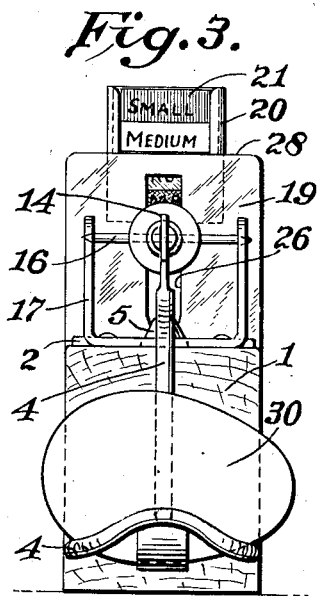
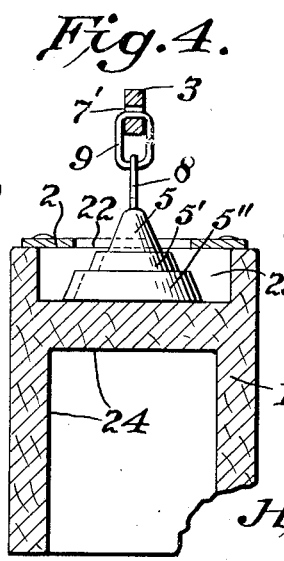
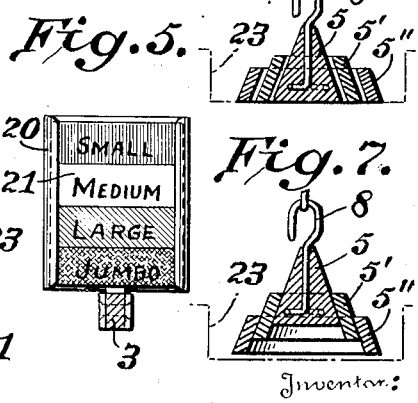
Inventor:
Harlan E. Thompson,
By William C. Linton
Attorney.

Patented Feb. 15, 1938

2,108,731

UNITED STATES PATENT OFFICE 2,108,731

AUTOMATIC GRADING SCALE

Harlan E. Thompson, Alpine, Calif.

Application February 24, 1937, Serial No. 127,493

2 Claims. (Cl. 265—48)

This invention relates to automatic grading scales and more particularly to automatic egg grading scales whereby the grade of an egg placed upon the scale is automatically and instantly shown.

The principal object of the invention is to provide an adjustable automatic grading scale which will instantly show the various grades or weights of objects being graded by being placed thereon.

A further object of the invention is to provide an automatic grading scale which will be simple and accurate in operation in order that the operator thereof may rapidly grade a number of objects and at the same time, receive accurate grading of the objects with the minimum of effort.

A still further object of the invention is to produce an automatic grading scale which would be economical to manufacture in order that the same may be commercially feasible and yet perform its necessary functions as required.

Another object of the invention is to produce an automatic grading scale having means for instantly showing the correct grade or weight of objects being graded in such a manner that a mere glance by the operator thereof is sufficient to comprehend the grade of the object.

And still another object of the invention is to produce an automatic grading scale having poises which automatically take their position on the scalebeam of said scale as required to balance the object being graded.

Other objects of the invention will be in part obvious and in part pointed out hereinafter.

In order that the invention and its mode of operation may be readily understood by persons skilled in the art, I have in the accompanying illustrative drawing and in the detailed following description based thereupon, set out an embodiment of the same.

The invention is illustrated in the accompanying drawing wherein:

Fig. 1 is a side elevation of the present invention as when in operation.

Fig. 2 is a top elevation of the present invention.

Fig. 3 is an end elevation of Fig. 1.

Fig. 4 is an enlarged cross section of the present invention as seen from an end and showing the poise-series in position.

Fig. 5 is a front elevation of the grade scale.

Fig. 6 is an enlarged cross section of the poise-series in resting position, and Fig. 7 is an enlarged cross section of the poise-series as when raised clear of its base.

Referring now more particularly to the accompanying drawing wherein like and corresponding parts are designated by similar reference characters throughout the several views, reference numeral 1 refers to the base block which supports the various other members of the entire scale a sufficient distance above a horizontal plane upon which the bottom of said base block 1 is placed in order that the scale may function without special consideration being given to the specific placing of the scale. Securely mounted to one side of the top face of said base block 1 is plate 2 which has formed at right angles therewith and at one end two support members 17. A pivot pin 16 is pivotally connected to each of the uppermost ends of said supports 17 and supports at its center a scalebeam 3 which is connected thereto. Said scalebeam 3 has a short section 12 thereof extending beyond both pivot pin 16 and one end face of base block 1 and the end 12 of said scalebeam 3 thus extended has formed therewith a pin 15. Said pin 15 pivotally supports an egg cradle 4 by means of a hook 14, formed by the end of the stem of said egg cradle 4, being hooked thereon. Said extending section 12 of scalebeam 3 is threaded and has rotatably and in threaded connection mounted thereon a counterpoise 6 and a nut 13. Section 27 of scalebeam 3 has opening 7 formed therethrough at definite positions in order that poise 10, shown in dotted lines in Fig. 1, may be hooked therethrough for support for adding a desired extra weight to the amount of weight required to operate the scalebeam 3. At opening 7' formed in the scalebeam 3 is hung a link 9 to which is hooked a hook 8. Said hook 8 is firmly connected to a poise 5 which is the key member of a poise-series 5, 5' and 5''. Said poise-series is composed, as shown in Fig. 6, of a central tapered poise 5 within a tapered opening formed in a second tapered poise 5' which in turn is within a tapered opening formed in a third tapered poise 5''. The poise-series as illustrated comprises three poises 5, 5' and 5'', but the poise-series may contain any number of tapered poises as the particular type of grading requires. Said poise-series 5, 5' and 5'' set within recess 23 formed in the base block 1 and project through plate 2 at an opening 22 formed in said plate 2 which has a diameter slightly smaller than that of the largest tapered poise 5'' in order to prevent said poise-series from entirely coming out of said recess 23.

Mounted in an upright position upon the end of section 27 of the scalebeam 3 is grade chart holder 20 having a grade scale 21 detachably mounted thereon. Said grade chart holder 20 faces and is parallel to the end face of said base block 1 next to said cradle 4 in order that an operator may readily see said cradle 4 and said chart 21 in a single glance. Mounted as at 18 on said base block 1 in such a position as to be in front of said grade scale holder 20 is a guide and cover member 19 having a guide opening 26 centrally formed therethrough. Said scalebeam 3 passes through said guide opening 26 in such a manner as to prevent any lateral movement of said scalebeam 3. However, said member 19 also prevents the operator from seeing more of chart 21 than is visible above the top edge 28 of member 19.

Said grade chart 21 as shown is expressly for the grading of eggs and each section thereof represents a different grade of egg and the sections are individually colored in order that an operator will readily know the grade shown without the necessity of reading the grade name set forth thereon.

When desirable to lighten the weight of said base block 1, a large recess 24, as shown in Fig. 4 and in dotted lines in Fig. 1, may be formed in said base block 1.

In the operation of the present device, when a given egg 30 is placed upon said cradle 4, the downward force thereof is exerted upon the end of section 12 of the scalebeam 3. This downward motion is resisted by pivot pin 16 with the result that there is a tendency for the end of section 27 of the scalebeam 3 to rise. If the egg being graded is of a grade commonly known as the "Peewee" variety, then the end of section 27 will not rise sufficiently to expose chart 21 above edge 28 of cover member 19. However, if the egg 30 being tested is of the next known grade commonly called "Small", then the chart 21 will be moved upwardly to set forth the colored section thereon designating the "Small" variety. If the egg being tested is of either the "Medium", "Large", or "Jumbo" grade, then the corresponding section upon the chart 21 will show just above the edge 28 of cover member 19.

The poise-series 5, 5' and 5" are of such weight as to counterbalance scalebeam 3 in order that the chart will show the grade according to the downward force exerted by the weight of the egg being graded, in order that the correct grade will appear upon scale 21. That is, the weight of section 27 of scalebeam 3 is sufficient to set the chart 21 for the "Small" grade egg section, but section 27 plus poise 5 is required to set the chart for a "Medium" grade egg, while if the egg is of the "Large" variety, then section 27 plus poise 5, plus poise 5' would be required. In the case of the "Jumbo" variety, the entire poise-series 5, 5' and 5" plus section 27 would be required to set the chart. Each member of the poise-series is so sized as to permit the next larger grade section to appear upon the chart 21 upon its addition to the previous poise or poises plus section 27 according to the amount of the downward force of the egg 30 being tested.

From the foregoing, it is obvious that for different objects being graded different sets of poise-series and grade scales will be substituted for the poise-series and grade scales used for egg grading.

By trial before the general use of the scale, various weights, each representing a specific grade of egg or object being graded, is placed upon the egg cradle 4 in order that the accuracy of the scale may be determined. If, however, the scale does not appear to be accurate, then counterpoise 6 may be rotated and thereby moved along section 12 of the scalebeam 3 until a final place is found for the counterpoise 6 at which point accurate grading takes place. When said position is found for the counterpoise 6, then nut 13 is tightened against one side of the counterpoise 6 for holding the two in a locked position. If it becomes necessary to add weight to section 27 of scalebeam 3 as for instance where there is a change in the regulations covering egg grading, then a poise 10 of a given weight may be hung from the scalebeam 3 at any one of openings 7. The particular opening 7 to be used depends entirely upon how much additional weight must be added to scalebeam 3, as the position of these openings 7 within the beam is predetermined according to the size of the weight or poise 10.

Manifestly, the construction herein shown is capable of considerable modification and such modifications as come within the scope of my claim, I consider within the spirit of my invention.

I claim:—

1. An automatic grading scale comprising a base block, a scalebeam pivotally mounted above said base block, means for supporting the article to be weighed connected to one end of said scalebeam, means disclosing the grade of the object being graded comprising a grade chart mounted upon the opposite end of said scalebeam, a cover plate mounted on said base block immediately in front of said grade scale, and said cover plate having a narrow opening formed therethrough through which passes said scalebeam, and means automatically counterbalancing the various downward forces of various objects as each is being graded.

2. An automatic grading scale comprising a base, a scalebeam pivotally mounted above said base, a cradle pivotally suspended from one end of said scalebeam, a grade chart mounted upon the other end of said scalebeam, a cover plate mounted on said base immediately in front of said grade scale in order that the successive sections of said grade chart when raised by said scalebeam will show only above the top of said cover plate to designate the grade of the object being graded, and means automatically counterbalancing the various downward forces of various objects as each is being graded.

HARLAN E. THOMPSON.